United States Patent [19]

Sperlich

[11] Patent Number: 4,628,506

[45] Date of Patent: Dec. 9, 1986

[54] METHOD FOR TRANSMITTING COMMUNICATIONS SERVICES VIA SATELLITES

[75] Inventor: Josef Sperlich, Backnang, Fed. Rep. of Germany

[73] Assignee: ANT Nachrichtentechnik GmbH, Backnang, Fed. Rep. of Germany

[21] Appl. No.: 661,337

[22] Filed: Oct. 16, 1984

[30] Foreign Application Priority Data

Oct. 21, 1983 [EP] European Pat. Off. ... EP83110528.3

[51] Int. Cl.$^4$ .......................... H04J 3/06; H04J 15/00; H04B 7/185; H04B 7/19
[52] U.S. Cl. .................................. 370/104; 370/118; 455/12
[58] Field of Search .................... 370/104, 63, 84, 118; 455/12

[56] References Cited

U.S. PATENT DOCUMENTS

| | | | |
|---|---|---|---|
| 4,145,573 | 3/1979 | Arnold | 370/104 |
| 4,206,322 | 6/1980 | Lurtz | 370/63 |
| 4,381,562 | 4/1983 | Acampora | 455/12 |
| 4,456,988 | 6/1984 | Nakagome et al. | 455/12 |
| 4,482,328 | 10/1984 | Alaria et al. | 370/63 |

FOREIGN PATENT DOCUMENTS 0033149  5/1981  European Pat. Off. .

OTHER PUBLICATIONS

Intelsat/IEEE International Conference on Digital Satellite Communication, "An Adaptive Multiple Access Satellite Communication System at Millimeter Wavelengths", 1969; Nishida et al; pp. 387–398.
Telcommunications and Radio Engineering, Part 2, Radio Engineering, vol. 33, No. 4 (1978); "The Future of Satellite Systems Development", Ainbinder et al; pp. 44–54.

Primary Examiner—Douglas W. Olms
Assistant Examiner—Frank M. Scutch, III
Attorney, Agent, or Firm—Spencer & Frank

[57] ABSTRACT

A method for transmitting communications services signals in time division multiplex operation with multiple access via a satellite equipped with a plurality of receiving and transmitting units between which any desired associations can be made by means of a switching matrix. A plurality of received communications services signals are switched through to at least one transmitting unit, where they are initially demodulated, then stored as pulse bursts and thereafter read out of a memory continuously at a lower bit rate than the pulse bursts had previously, to finally be transmitted as modulated data in the form of at least one continuous bit stream.

7 Claims, 7 Drawing Figures

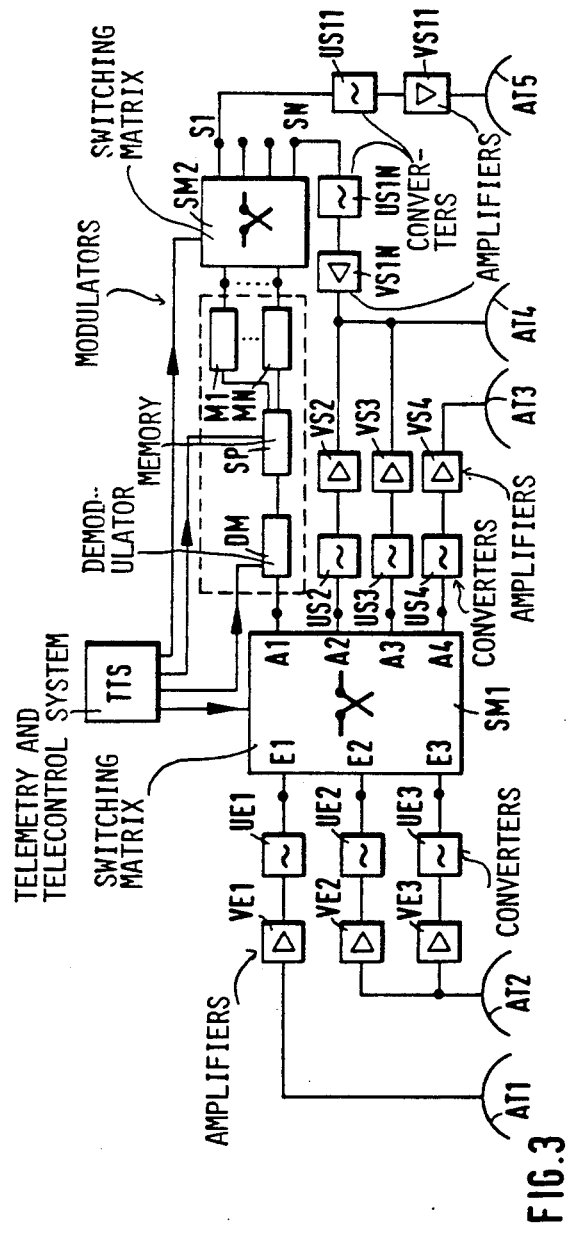
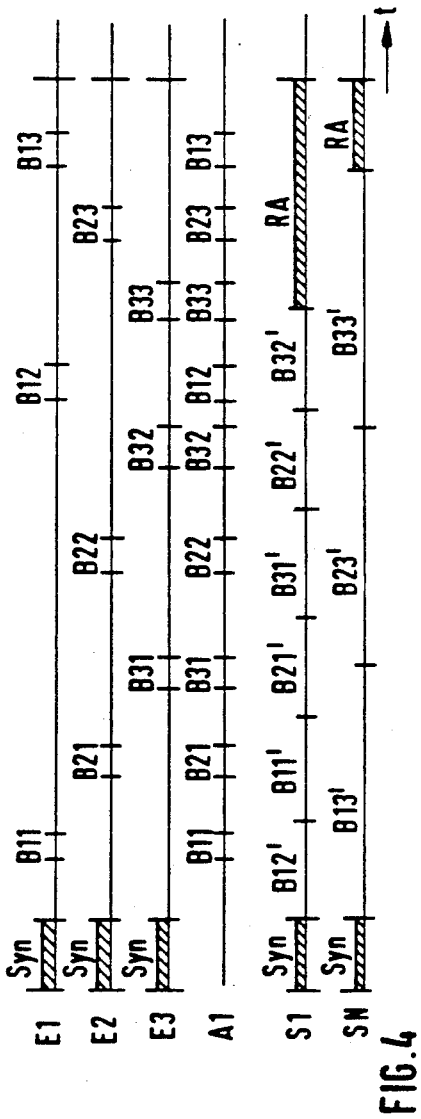
FIG.3
FIG.4

4,628,506

METHOD FOR TRANSMITTING COMMUNICATIONS SERVICES VIA SATELLITES

BACKGROUND OF THE INVENTION

The present invention relates to a method for transmitting communications services in time division multiplex operation with multiple access (TDMA) via a satellite having a plurality of receiving and transmitting units between which any desired connection can be established by means of a switching matrix.

Such a method, which makes it possible, for example, to broadcast a communications service emanating from a ground station over a plurality of different traffic regions or to broadcast the communications services from a plurality of ground stations to a single common traffic region, is disclosed in European Pat. No. 33,149.

SUMMARY OF THE INVENTION

It is now an object of the present invention to provide a method of the above-mentioned type according to which the communications services can be broadcast by the satellite with the lowest possible transmitting power and in a form favorable for demodulation in receivers on the ground.

The above and other objects are achieved, according to the present invention, by switching data signals from a plurality of received communications services through to at least one transmitting unit where they are initially demodulated and then stored in the form of pulse bursts, therefter reading the stored signals out from the memory continuously and at a lower bit rate than that associated with the pulse bursts, and finally transmitting the data in the form of a continuous stream of bits.

Due to the fact that the signals of the communications services are transmitted by the satellite in a continuous stream of bits, it is easy to demodulate these signals at the receiving end. Moreover, the receivers need be designed to operate only in a narrow band since the bit stream transmitted by the satellite has been subjected to a reduction in bandwidth.

The present invention will now be described in greater detail with reference to embodiments illustrated in the drawings.

BRIEF DESCRIPTION OF THE DRAWINGS

FIG. 3 is a block circuit diagram for an expanded SS-TDMA system according to the invention.

FIG. 4 is a view similar to that of FIG. 2 of the input and output signals of the expanded system of FIG. 3.

DESCRIPTION OF THE PREFERRED EMBODIMENTS

Figure 1:
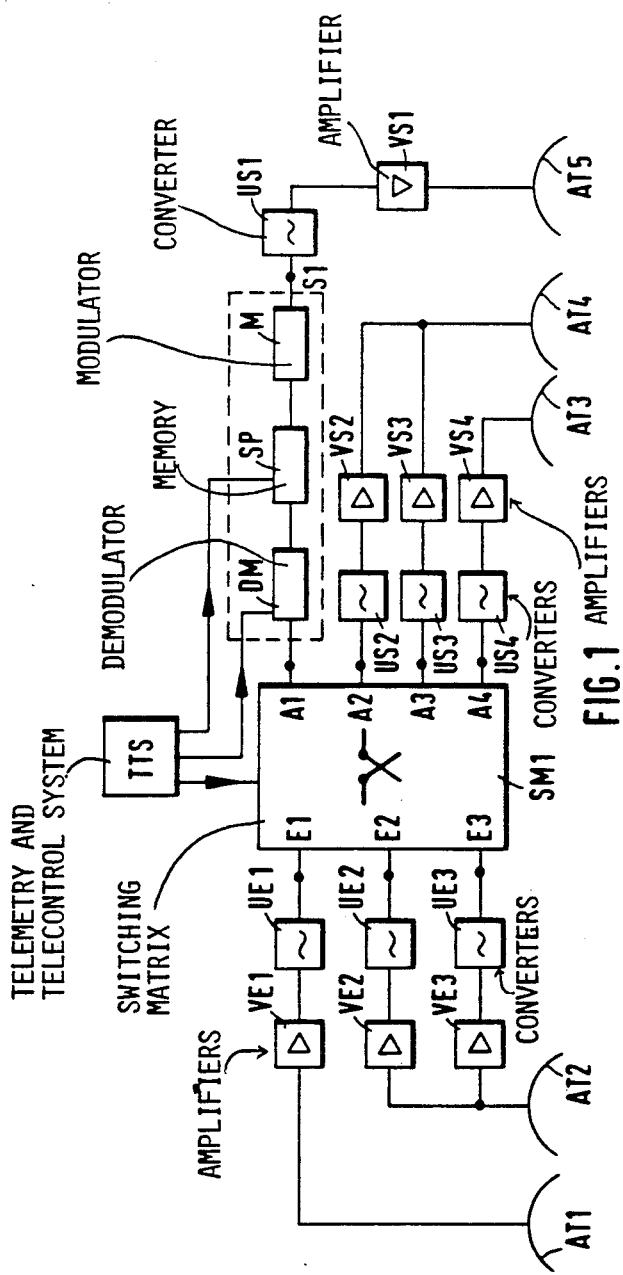
FIG. 1 is a block circuit diagram for a satellite-carried SS-TDMA (satellite switched TDMA) system according to the invention.

In the satellite switched time division multiplex multiple access (SS-TDMA) system of FIG. 1, receiving units composed of receiving antennas AT1 and AT2, amplifiers VE1, VE2 and VE3 and converters UE1, UE2 and UE3 are connected to the inputs E1, E2 and E3 of a switching matrix SM1. The outputs A2, A3 and A4 of switching matrix SM1 are connected to transmitting units including converters US2, US3, US4, amplifiers VS2, VS3, VS4 and transmitting antennas AT3 and AT4. With the aid of switching matrix SM1, each receiving unit can be switched to each one of the existing transmitting units. Each transmitting unit is assigned to a certain broadcast region on the ground. Thus a communications service broadcast by a ground station to a receiving unit of the satellite can be retransmitted via a selected transmitting unit to its assigned broadcast region on the ground.

It is, however, also possible to broadcast all of the communications service signals received by all receiving units over a single transmitting unit in time division multiplex operation with multiple access (TDMA). Such a transmitting unit is connected to output A1 of switching matrix SM1 and includes a demodulator DM, a memory SP, a modulator M, a converter US1, an amplifier VS1 and an antenna AT5. Demodulator DM initially converts to binary signals the pulse bursts of the communications service signals switched through from inputs E1 to E3 to output A1 of switching matrix SM1. Then the binary signals are stored in the form of pulse bursts in memory SP.

Thereafter the pulse bursts are read out of memory SP in a continuous series and at a lower bit rate than at which they were read into the memory. Due to the lower bit rate, a narrower transmission frequency band is required on the transmission path from the satellite to the ground. This results advantageously in a reduction of the transmitting power for amplifier VS1 of the satellite. The continuous bit stream leaving memory SP is phase modulated in modulator M and, before being broadcast via antenna AT5, is transposed to the desired transmission frequency band by means of an HF carrier.

Due to the above-described measures, the receivers on the ground need be designed to receive only a narrow frequency band and to be able to process continuous bit streams, so that relatively uncomplicated demodulators can then be employed.

Figure 2:
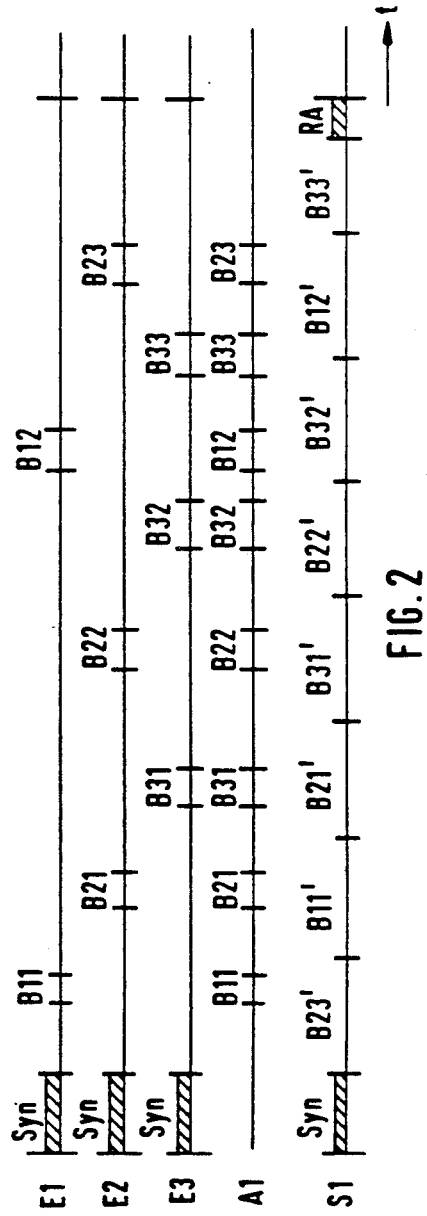
FIG. 2 is a series of signal diagrams showing the pulse patterns of the input and output signals of the system of FIG. 1.

FIG. 2 shows the pulse frames of the SS-TDMA system of FIG. 1. At input E1 of switching matrix SM1 there appears the pulse frame containing pulse bursts B11 and B12 which are associated with certain communications services; at input E2 there is the pulse frame containing pulse bursts B21, B22 and B23 and at input E3, the pulse frame containing pulse bursts B31, B32 and B33, with each pulse frame beginning with a synchronizing word and all pulse bursts being interleaved in time according to the TDMA method. At output A1 of switching matrix SM1, the pulse bursts of the communications services under consideration in the three above-mentioned pulse frames appear consecutively in time.

The converters UE1, UE2 and UE3 connected to the inputs of the switching matrix SM1 are mixers which convert the carrier frequencies of the input signals down. The converters US1 ... US4 connected to the outputs of the switching matrix SM1 are mixers which convert the carrier frequencies of the signals at points S1, A2, A3 and A4 up.

The significance of the numerical indicia associated with the pulse bursts Bxy shown in FIG. 2 and 4 is: The first index x indicates the input (Ex, x=1, 2 or 3) of the switching matrix SM1 where the pulse frame containing this pulse burst Bxy comes in. The second index y indicates the sequence of the pulse bursts Bxy within a pulse frame.

The pulse bursts B23' ... B33' in the pulse frame at point S1 have the same sequence as the pulse bursts B11 ... B23 in the pulse frame at point A1. But the pulse bursts B23' ... B33' at point S1 are time shifted against the pulse bursts B11 ... B23 at the point A1 conditioned by the processing of the demodulator DM, the memory SP and the modulator M. Therefore the first pulse burst B11' appears in the second time slot of the pulse frame at point S1 and the first time slot is occupied by the last pulse burst B23' of the foregoing pulse frame.

The rearrangement of the pulse bursts in the pulse frames at point A1 ... A4 respectively at point S1 is produced by the switching matrix SM1.

Demodulator DM, memory SP and modulator M then produce, at point S1, a pulse frame in which the pulse bursts are combined continuously, with the pulses having a reduced bit rate, without any time intervals between them. If these pulse bursts do not completely fill the pulse frame, the remaining space is filled with statistical information RA.

Each pulse burst transmitted from the ground to the satellite has in it some bits preceding the actual information which serve to synchronize demodulator DM. These bits need not be stored in memory SP. The pulse bursts of the pulse frame to be broadcast and appearing at point S1 therefore no longer contain these synchronization bits as indicated by a prime symbol after each pulse burst identification.

According to the modulation (frequency, phase) of the signals at point A1 the demodulator DM is a frequency or phase (e.g. PSK) demodulator which can be implemented by one skilled in the art. The operation of this demodulator DM is synchronized by the synchronization bits at the beginning of each pulse burst.

The flexibility of the above-described system can be improved if a demodulator DM is employed which can be set to various bit rates. Particularly in connection with phase modulated signals, it is possible to switch from, e.g., signals modulated with 16 phases to signals modulated with 8, 4 or 2 phases, which, with a fixed Baud rate, corresponds to cutting the transmitted binary bit rate in half. The switching may be effected, for example, via a conventional telemetry and telecontrol system TTS of the satellite which is generally also used to distribute the switching times for switching matrix SM1. But the switching can also be effected by a reference ground radio station.

The control provided in any case for the switching matrix could also be used to switch the demodulator to the desired bit rates and switching of the bit rate could take place within a pulse frame between one pulse burst and the next.

In the memory circuit SP a synchronization word Syn is stored which is added to each pulse frame that is read out of the memory. The memory SP also fills the statistic information RA in the place of the pulse frame which is not filled by pulse bursts. The clock information for the earth station receiver is inherent in this statistical information RA. Therefore the statistical information RA makes it possible that the receiver gets the clock information during the whole pulse frame without interruption by in a time slot where no pulse burst is present.

The signals broadcast from antennas AT3 and AT4 have a higher bit rate than the signals broadcast from antenna AT5 in which signal path the demodulator DM, the memory SP and the modulator M are inserted.

FIG. 3 shows an SS-TDMA system which is an expanded version of that shown in FIG. 1. With this system, it is possible to associate individual narrowband communications services or service groups with different modulations and/or broadcast directions. For this purpose, memory SP has several outputs to which it is possible, under control of the above-mentioned telemetry and telecontrol system, to distribute signals associated with different communication services. Each memory output is connected with its own modulator M1 ... MN, with the modulators differing from one another with respect to type of modulation and possibly with respect to the bit rate of the bit streams to be broadcast.

The outputs of memory SP are connected via modulators M1 ... MN with respective inputs of a second switching matrix SM2. Converters US11 ... US1N with subsequent amplifiers VS11 ... VS1N are connected with respective outputs S1 ... SN of switching matrix SM2 and these amplifiers lead to respective antennas AT4, AT5 which radiate in different directions. This arrangement permits flexible association of the communications services with various broadcast zones, and differentiation with respect to type of modulation and/or bit rate may also be made between the individual communications services. Switching matrix SM2 may be operated by the same control system, e.g. the telemetry and telecontrol system, as the above described switching matrix SM1.

Figure 3A:
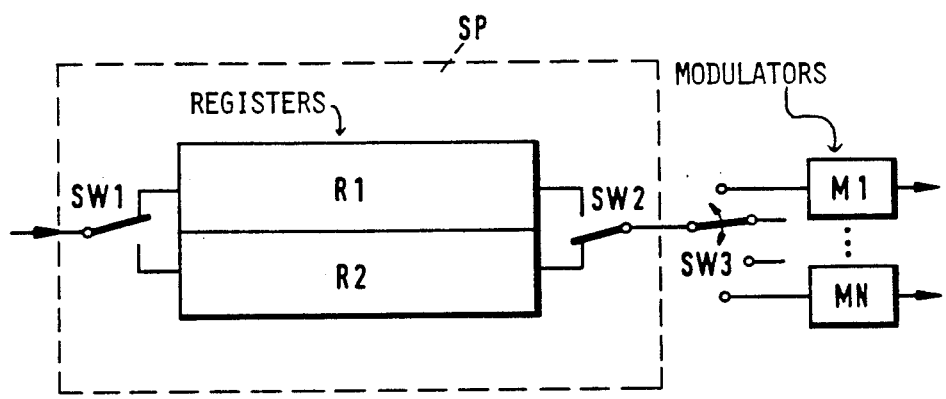
FIG. 3a is a schematic representation of a memory circuit inserted in the SS-TDMA system.

A suitable embodiment of a memory SP is shown in figure 3a. This memory has two registers R1 and R2. A switch SW1 leads the output signal of the demodulator to the input of one of the two registers which reads this signal in. During this time a switch SW2 connects the output of the other register to the output of the memory SP and the pulse frame stored in this register is read out. Whenever the input switch SW1 of the memory SP is switched to the input of the register R1 the output switch SW2 is switched to the output of the register R2 and vice versa. The output switch SW2 leads the pulse frame which is read out of one of the two registers to a switch SW3 which connects the memory output to one of several different modulators M1 ... MN.

The switches SW1, SW2 and SW3 are controlled by the telemetry and telecontrol system TTS which controls also the switching matrices SM1 and SM2. Such a telemetry and telecontrol system TTS is a standard logic network which can be implemented by one skilled in the art. In the U.S. Pat. No. 4,145,573 a SS-TDMA system with a switching controller is disclosed.

All outputs S1 ... SN of the switching matrix SM2 are connected to converters US11 ... US1N, amplifiers VS11 ... VS1N and antennas.

FIG. 4 shows pulse frames which appear at points E1, E2, E3, A1, S1 and SN of the system of FIG. 3. According to this embodiment, the signals associated with the different communications services are separated in memory SP in such a manner that the pulse frame at output S1 of switching matrix SM2 contains pulse bursts B12', B11', B21', B31', B22' and the pulse frame at output SN contains the remaining pulse bursts B13', B23', B33' received by the satellite.

One embodiment of the SS-TDMA system will now be described for traffic between three narrowband communications services—e.g. the transmission of search requests for subscribers of a selective call system, the transmission of communications for users of a public mobile land radio network and the transmission of traffic warning messages.

Figure 5:
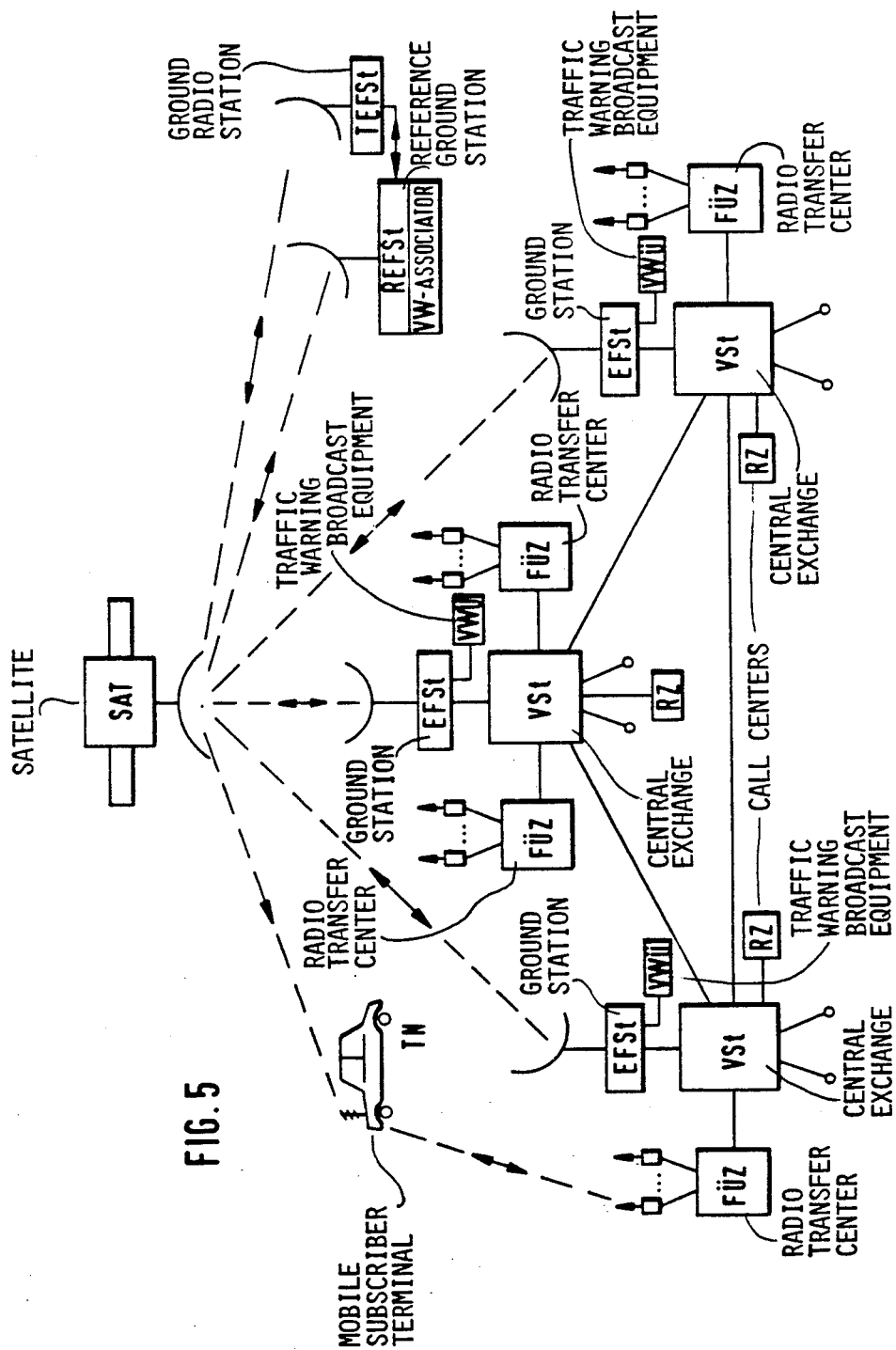
FIG. 5 is a schematic representation of a ground network for the transmission of signals associated with three narrowband communications services according to the invention.

FIG. 5 is a schematic representation of the structure of a ground traffic station for broadcasting and receiving signals for the above-mentioned three communications services with the inclusion of a satellite SAT operated according to the SS-TDMA method as described above.

Ground stations EFSt connected directly or via central exchanges VSt of, e.g., telephone systems, with call centers RZ, radio transfer centers FÜZ and traffic warning broadcasting equipment VWÜ are available for the transmission of communications services signals between satellite SAT and users on the ground. Call centers RZ are responsible for the issuance of search requests to mobile subscriber terminals TN of a selective call system, the radio transfer centers FÜZ are responsible for issuance of search requests and information to subscribers TN of a public mobile land radio network, and traffic warning broadcasting equipment VWÜ is responsible for preparing and broadcasting traffic warning messages.

The assignment of transmission capacity to ground radio stations EFSt is made by a reference ground station REFSt which, for security reasons, is generally provided with a back-up station. The reference ground radio station REFSt also takes care that the pulse bursts for the communications services signals do not overlap if traffic takes place simultaneously over a plurality of receiving and transmitting units in satellite SAT.

The necessary telemetry and telecontrol information is transmitted by a separate ground radio station TEFSt linked to station REFSt. Station TEFSt is responsible, inter alia, for position control and operational monitoring of the satellite and may also take care of transferring information for the switching matrix controls. All existing switching matrixes can be operated by a single control.

The difference between the selective call system S, also known as paging system, and the public mobile land radio F is the following: The selective call system S is a unidirectional connection outgoing from a stationary subscriber via call center RZ of a central exchange VSt, ground station EFSt and satellite SAT to a mobile subscriber TN. The public mobile land radio F transmits speech and/or data signals from and to a stationary subscriber to and from a mobile subscriber. There is a bidirectional connection between stationary subscriber and mobile subscriber; from stationary subscriber to mobile subscriber via central exchange VSt, ground station EFSt and satellite and from mobile subscriber to stationary subscriber via radio transfer center FÜZ and central exchange VSt.

Figure 6:
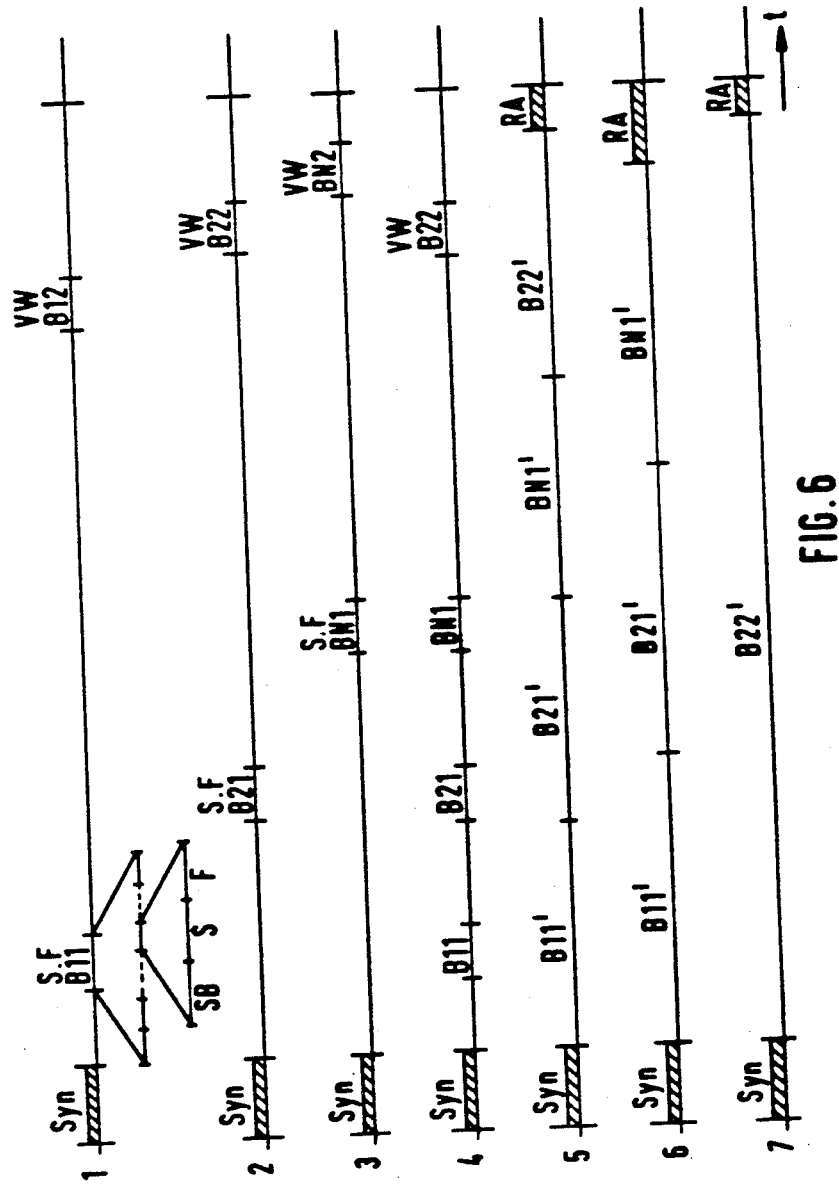
FIG. 6 is a view similar to that of FIG. 2 relating to the signals associated with the communications services of FIG. 5.

FIG. 6 shows a plurality of pulse frames with which the traffic patterns of the three communications systems—selective call system S, public mobile land radio F and traffic warning messages VW—are to be explained.

Pulse frame 1, beginning with a synchronizing word Syn as do all other pulse frames, comprises pulse bursts B11 containing signals for services S and F and B12 containing signals for service VW, which signals are transmitted from ground radio stations EFSt to a first receiving unit of satellite SAT. Pulse frame 2 contains pulse bursts B21 and B22 offset in time with respect to the pulse bursts of the first pulse frame 1 and the pulse of frame 2 are transmitted to a second satellite receiving unit. The pulse bursts BN1 and BN2 are similarly offset in time in pulse frame 3 and are transmitted to a third receiving unit of the satellite.

One possible pulse burst structure, here shown for the example of pulse burst B11 transmitted by a ground radio station EFSt, is composed of a series of individual smaller pulse bursts. Each of the smaller pulse bursts has at its beginning a few bits SB to synchronize the demodulator in the satellite, followed by informations from the communications services selective call system S and from the public mobile land radio F. During the transmission of the pulse bursts into the memory of the satellite, no synchronizing bits SB are stored in the memory. In FIG. 6, the absence of these synchronizing bits in the pulse bursts appearing on the other side of the memory is marked by a prime symbol. Under control of reference ground radio station REFSt or a ground radio station EFSt, only one of pulse bursts B12, B22 or BN2 of the traffic warning messages is transmitted from satellite SAT during each pulse frame.

All pulse bursts switched through to output A1 of switching matrix SM1 are combined in pulse frame 4. This pulse frame is transferred into memory SP.

Pulse frame 5, in which pulse bursts B11', B21', BN1' and B22' at reduced bit rate form one continuous series, is broadcast to the ground from satellite SAT over a single downward path. Alternatively, the pulse bursts may be distributed to various pulse frames 6 and 7 which are broadcast in different directions. In that case, pulse bursts B11', B21' and BN1' are broadcast in pulse frame 6 over one downward path and pulse burst B22' is broadcast in pulse frame 7 over a different downward path. Different bit rates may also be employed here and, if required, a compensation with respect to the same frame duration can be effected by way of frame compensations signals RA of different lengths.

While for communications services S and F, one report can be followed directly by another report, for traffic warning messages VW the next message can be broadcast only after the preceding message is completed. Simultaneous upward transmission of several traffic warning messages would require storage of a relatively large quantity of data in the satellite, since with digitalization (PCM or delta modulation coded language), even a shirt message would require many kbits of information to be stored. It is therefore proposed for traffic warning broadcasting equipment VWÜ to initially indicate to reference ground radio station REFSt that equipment VWÜ intends to broadcast a message. For this purpose, station REFSt has a traffic warning (VW) associator.

This can be done via the satellite path, together with traffic requirement messages from ground radio stations EFSt. The associator determines when a particular traffic warning broadcasting equipment VWÜ is permitted to make its report. By way of the telemetry and telecontrol ground radio station TEFSt or—if this is included in the set-up—via a separate telecontrol channel, the control for switching matrix SM1 of the satellite is informed when and from which receiving unit the next pulse bursts of the traffic warning messages are to be switched through to the memory.

The associator under discussion can then advantageously also be used to arrange several other communications services in the desired priority sequence for transmission to the satellite. For this purpose, the communications services to be transmitted from the various ground radio stations are reported to the associator. The latter then causes the reference ground radio station REFSt to control the other ground radio stations EFSt in such a manner that their communications services are broadcast in the fixed sequence.

The ground receivers of the traffic warning messages either synchronize themselves with the message portion of the common frame or with the frame intended for the traffic warning messages and convert the received digital information, by means of D/A converters, to voice messages. If the message information is additionally associated with an identification signal for regional priority and if the receivers can be set to various regions or entire areas, a setting may be made in the receiver as to which messages are to be evaluated and which may be suppressed.

A particular advantage of the system described here is that the same terrestrial receiver can be utilized for various communications services or groups of communications services and the satellite takes over the large area broadcasting necessary to reach subscribers to a communications service or receivers of information when these receivers are spread over a large area.

It will be understood that the above description of the present invention is susceptible to various modifications, changes and adaptations, and the same are intended to be comprehended within the meaning and range of equivalents of the appended claims.

What is claimed is:

1. Method for transmitting signals associated with a plurality of communications services in time division multiplex operation with multiple access (TDMA) via a satellite equipped with a plurality of receiving units for receiving signals from ground stations, a plurality of transmitting units for transmitting signals to ground stations, and a switching matrix having a plurality of inputs each connected to a respective receiving unit and a plurality of outputs each connected to a respective transmitting unit, the switching matrix being operative for establishing selected connections between its inputs and outputs, said method comprising: switching, by means of the matrix, signals associated with a plurality of services and received at the satellite by at least two of the receiving units to at least one of the transmitting units in the form of signal pulse bursts; demodulating the switched signals in the one transmitting unit; storing the demodulated signals in a memory of the one transmitting unit; then reading the stored signals out of the memory continuously at a pulse rate lower than that of the pulse bursts switched to the one transmitting unit; and broadcasting from the satellite the signals read out of the memory in the form of a continuous stream of signal bits at the lower pulse rate.

2. A method as defined in claim 1 wherein said step of reading out comprises: forming the signals being read out into a succession of time frames each of selected duration, placing a synchronizing signal at the beginning of each time frame; and filling the end of each frame which is not completely filled with signals with frame filling signals.

3. A method as defined in claim 1 wherein: signals are to be broadcast from the satellite with respectively different modulations; the satellite is equipped with at least two transmitting antennas each arranged to broadcast signals to a respective ground region; said step of reading out includes supplying the signals which are to be broadcast with each type of modulation to a respective one of a plurality of modulators, and switching the modulated signals from each modulator to an associated one of the transmitting antennas via a switching matrix.

4. A method as defined in claim 3 wherein said step of reading out further includes selectively varying the pulse rate at which signals are supplied to each modulator.

5. A method as defined in claim 3 wherein said step of reading out further includes selectively varying the type of modulation applied to the signals switched to each transmitting antenna.

6. A method as defined in claim 1 wherein said step of storing is carried out by storing demodulated signals from at least two receiving units in a single memory of the one transmitting unit.

7. A method as defined in claim 2 wherein the frame filling signals contain clock information.

* * * * *